United States Patent [19]
Buchhave et al.

[11] Patent Number: 6,117,203
[45] Date of Patent: Sep. 12, 2000

[54] PATHOGEN REDUCTION SYSTEM USED IN TREATING WASTEWATER

[75] Inventors: Karsten Buchhave, Skanderborg; Edvin Andersen, Glamsbjerg, both of Denmark

[73] Assignee: Kruger, Inc., Cary, N.C.

[21] Appl. No.: 08/966,728

[22] Filed: Nov. 10, 1997

[51] Int. Cl.[7] .............................. C05F 5/00; B01D 35/18; B01D 24/00; C02F 1/00

[52] U.S. Cl. .............................. 71/12; 210/175; 210/253; 210/609; 210/742; 210/774; 210/768

[58] Field of Search ..................... 71/9, 12, 14; 210/609, 210/175, 253, 768, 774, 742

[56] References Cited

U.S. PATENT DOCUMENTS

| | | | |
|---|---|---|---|
| 3,319,586 | 5/1967 | Albertson et al. | 110/8 |
| 3,580,193 | 5/1971 | Logan | 110/8 |
| 3,697,417 | 10/1972 | Teletzke et al. | 210/10 |
| 3,913,500 | 10/1975 | Paccione et al. | 110/8 |
| 4,246,099 | 1/1981 | Gould et al. | 210/603 |
| 4,775,467 | 10/1988 | Calltharp et al. | 210/142 |
| 5,021,161 | 6/1991 | Calltharp | 210/614 |
| 5,232,596 | 8/1993 | Castaldi | 210/603 |
| 5,451,319 | 9/1995 | Kobayashi | 210/603 |

OTHER PUBLICATIONS

Wastewater Engineering, Treatment, Disposal and Reuse, Metcalf & Eddy, Inc., p.852–853, 1991.

H.P. Zweifelhoper, "Experience with Aerobic, Thermophilic Disinfection of Sewage Sludge, at the Wartau Sewage Treatment Plant, and with Prepasteurizatin, at the St. Gallen-–Hofen Works, also in Switzerland," pp. 3–37.

*Primary Examiner*—Wayne Langel
*Assistant Examiner*—Melanie C. Wong
*Attorney, Agent, or Firm*—Coats & Bennett, PLLC

[57] ABSTRACT

A pathogen reduction system for a sludge treatment process that employees multiple reactors operating in a batch mode to reduce pathogen levels in the sludge while providing a continuous flow of pathogen reduced sludge to a digester. In addition, the present invention entails an efficient heat exchanger for heating and cooling the sludge being treated in the above process. In particular, the heat exchanger is of the counterflow type and includes a helical coil confined in an annular chamber for transmitting one media and wherein the helical coil is spaced so as to form another helical flow channel that is defined by the annular chamber and the helical coil itself. Consequentially, one media is directed through the helical coil while another media is directed through the flow channel that is defined in part by the helical coil.

23 Claims, 5 Drawing Sheets

PATHOGEN REDUCTION SYSTEM USED IN TREATING WASTEWATER

FIELD OF THE INVENTION

The present invention relates to wastewater treatment systems and, more particularly, to a pathogen reduction system for treating sludge.

BACKGROUND OF THE INVENTION

Wastewater treatment systems are widely used throughout the world to remove nutrients such as nitrogen and phosphorous from the wastewater as well as destroy pathogens and viruses within the resulting sludge before the purified effluent is discharged and before the final treated sludge is removed from the wastewater treatment system.

Typically, in a wastewater treatment system, wastewater influent is directed through a series of a secondary treatment zones and subjected to various forms of treatment such as, for example, anaerobic, aerobic, and/or anoxic treatment. After such treatment, the wastewater is directed to a final clarifier which separates sludge in the wastewater from purified effluent. The purified effluent is discharged into a stream or lake, for example, while the sludge from the final clarifier is returned to the head of the activated sludge system and mixed with the influent wastewater to form what is commonly referred to as mixed liquor. Throughout the wastewater treatment process, the sludge from the final clarifier is recycled through the activated sludge system. The biomass or microorganisms associated with the recycled sludge act to effectively remove nutrients such as nitrogen and phosphorous and reduce BOD and other contaminant levels within the wastewater being treated.

However, the sludge being recycled through the activated sludge system has to be continually removed or wasted from the process. In addition, depending on a number of factors such as the contaminant levels in the wastewater influent, certain amounts of primary sludge may be removed during primary treatment without being processed through the activated sludge system. This primary sludge is then mixed with the secondary sludge wasted from the activated sludge process and the mixture is subjected to further treatment where contaminants are removed or separated from the sludge. In a typical wastewater treatment system, this sludge mixture is directed to a digester where the sludge is treated and cleaned by removing pathogens and volatile solids. Usually, one of the most convenient methods of disposal of the resulting sludge is, for example, by land applications.

Existing wastewater facilities are often designed and built to handle a particular processing capacity and to produce a certain quality of effluent. As technology improves or as conditions change over time, such as where the quality of the wastewater deteriorates or where the processing capacity of the system is exceeded, these wastewater facilities become relatively inefficient.

In addition, many treatment processes for wastewater are batch-type processes. This means that large tanks are necessary in order to process the large batches of wastewater where these tanks are sized relative to the capacity of the treatment plant. Accordingly, the throughput of a conventional wastewater treatment system is limited by the capacity of the tanks and the time required for each batch process in the wastewater treatment procedure.

Batch processing of sludge also create a number of additional problems. For instance, treated sludge resulting from a batch process performed in a large tank may exhibit nonuniformities which may be attributed to such causes as poor mixing of treatment chemicals with the sludge or, where a heat treatment is used, to improper distribution of heat within the sludge. Excessive agitation of the sludge or extended sludge retention time may often be necessary to compensate for the shortcomings in batch processes, but these measures are not always effective. Furthermore, pipes, pumps, valves, and associated equipment used for directing the sludge through the treatment system spend a significant amount of time in a dry state after batches of sludge have been transferred to the processing tanks. Thus, any residual sludge remaining in these peripheral items will dry and leave a residue during each subsequent dry state, leading to frequent, difficult, and costly maintenance of these parts.

On the other hand, experience has shown that some of the processes in a wastewater treatment system are actually more efficient when operated in a continuous manner instead of being subject to batch processing. For example, anaerobic digesters are generally more efficient when exposed to a continuous flow of sludge. This way, the microorganisms which are operative during the anaerobic treatment are maintained in a continuous active state and are thus more effective in removing contaminants from the sludge. In contrast, in a batch process where the activity of the microorganisms tapers off near the end of the digestion process, additional time is required in a subsequent batch of sludge to rejuvenate the microorganisms to an effective level. That is, batch processing limitations again result in additional process time for treating the sludge.

The incompatibility between batch and continuous flow processes is evident particularly in a wastewater treatment system which must be expanded to meet increased processing demands. Since these plants are typically arranged to operate in a batch mode, large additional batch tanks are necessary and the physical land space required for this new equipment is often measured in terms of acres. In addition, the costs involved in such an undertaking are often relatively high when compared to the limited flexibility for future expansion gained for the investment. Furthermore, the commensurate increase in operating and maintenance costs combined with the other shortcomings suggests that a more flexible and efficient alternative is needed.

SUMMARY OF THE INVENTION

The present invention relates to a pathogen reduction system for a sludge treatment process that uses multiple reactors operating in batch mode to reduce pathogen levels in the sludge while providing a continuous flow of pathogen-reduced sludge to a digester. This process significantly reduces the time required to treat the sludge in the digester, in some cases up to a 50% reduction in time, by removing pathogens from the sludge prior to the digestion process. In addition, the present invention requires relatively little equipment to accomplish its purpose, resulting in a significantly lower cost, a smaller footprint or space requirement, and greater flexibility for future expansion as compared to other wastewater treatment processes.

In order to achieve a continuous flow of sludge to the digester, the present invention uses multiple reactors operating in a batch mode and connected in parallel to a common input and a common output line for the sludge being treated. Each reactor is operable to assume a feeding mode, where the reactor is being filled with sludge; a holding mode, where the reactor is holding and treating the sludge; and a discharge mode, where the reactor is discharging the sludge to the digester. In a preferred embodiment, at least three reactors are used wherein, at any one time, at least one reactor is in the feeding mode, another reactor is in the storage mode, and a third reactor is in the discharge mode. Since each reactor proceeds from the feed mode to the holding mode and then to the discharge mode in a continuous cycle, each successive reactor must be staggered by one mode with respect to the preceding reactor. That is, if the time periods for the feeding, holding, and discharge modes between successive reactors are all the same and these modes are staggered between reactors, at least one reactor will always be in the discharge mode, thereby providing a continuous flow of sludge to the digester.

In order to achieve the desired result of synchronization between mode changes in successive reactors, the selected time period for each mode must correspond to the holding time necessary in a single reactor to reduce the pathogen levels in the sludge to meet a selected standard. At the same time, temperature is an additional factor which must be considered and the sludge is accordingly heated to a minimum temperature before being transferred to the reactors. Thus, for example, experience has shown that sludge heated to approximately 65 to 75° C. requires approximately 1 hour of retention time in order to reduce the levels of pathogens to meet certain standards set by the EPA. Accordingly, in systems where three reactors are used, the reactors may be set for 1 hour in the feed mode, 1 hour in the holding mode, and 1 hour in the discharge mode and the transitions between modes are synchronized between successive reactors.

A new efficient heat exchanger particularly for heating and cooling the sludge in a sludge treatment process has also significantly contributed to the effectiveness of the present invention. The heat exchanger is similar in general operation to a dual coil heat exchanger that includes concentric helical coils to separate two counter-flowing liquid mediums. However, in the present invention, one media flow path is formed by a helical flow channel that is defined by an inner and outer sleeve encasing a single tubular helical coil. That is, the inner and outer sleeves and the spaces between successive coils of the tubular helical coil define the helical flow channel. In essence, this heat exchanger design retains the efficiency of a conventional dual coil heat exchanger, but is structured to handle the flow of viscous sludge through the coils while being relatively simple to clean and maintain.

The use of parallel processing reactors operating in batch mode so as to provide a continuous outflow of sludge to the digester, combined with the use of the new heat exchanger design to heat and cool the processed sludge, results in a very compact and efficient pathogen reduction system.

In some cases, the pathogen reduction system of the present invention cuts the digestion time required to treat the sludge in half, resulting in a greatly increased throughput capacity for the sludge treatment system with minimal equipment and space requirements. Thus, increased processing capacity with minimal equipment addition is another advantage of the present invention.

From the compact size and the minimal mechanical equipment requirements of the pathogen reduction system, other advantages naturally follow. For example, a lower initial cost, lower operating and maintenance costs, and flexibility to expand a sludge treatment system in the future are some of the further advantages of the present invention.

It is therefore an object of the present invention to provide an efficient and cost effective pre-pasteurization process for treating sludge.

Another object of the present invention is to provide a pre-pasteurization process that effectively reduces digester retention time thereby increasing the capacity of the digester.

Another object of the present invention is to provide a combined pre-pasteurization and digestion process that provides for an efficient and high degree of heat recovery.

Still a further object of the present invention is to provide a combined pre-pasteurization and digestion process that uniformly loads the digester and provides a constant production of biogas.

Another object of the present invention is to provide a heat exchanger design for handling sludge-to-sludge media which can be quickly and easily cleaned and maintained.

Other objects and advantages of the present invention will become apparent and obvious from a study of the following description and the accompanying drawings which are merely illustrative of such invention.

DETAILED DESCRIPTION OF THE INVENTION

Figure 1:
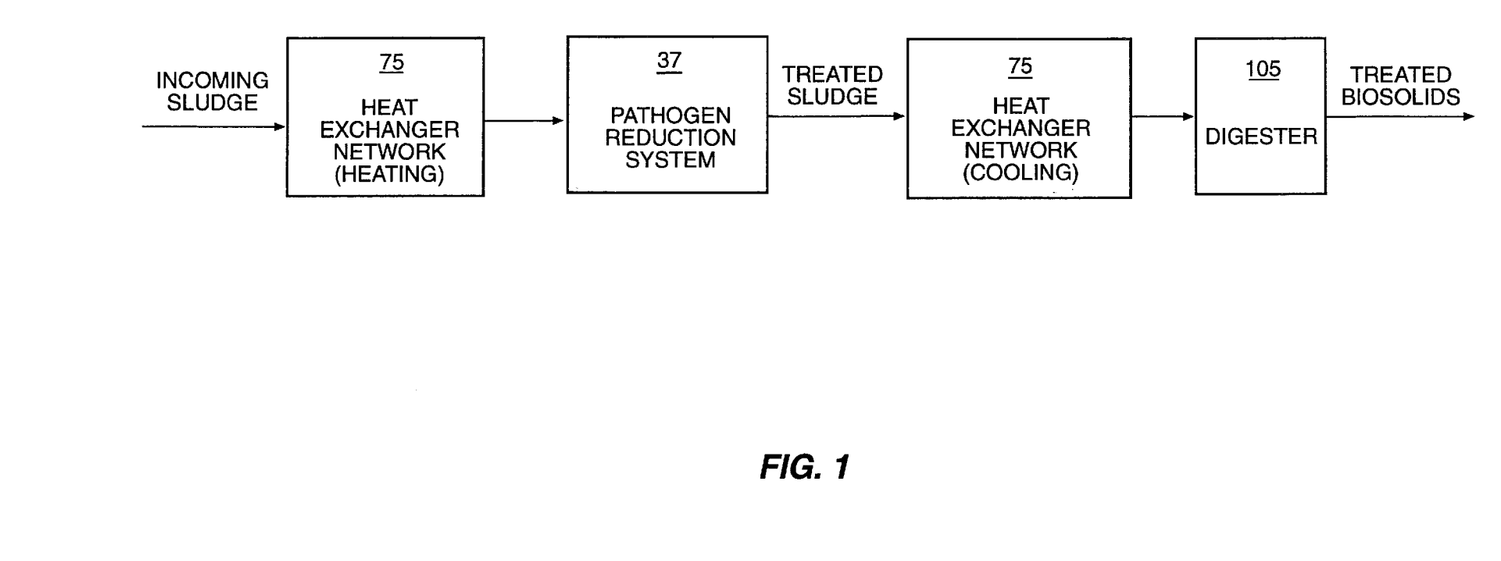
FIG. 1 is a schematic illustration of the pathogen reduction system of the present invention.
Figure 2:
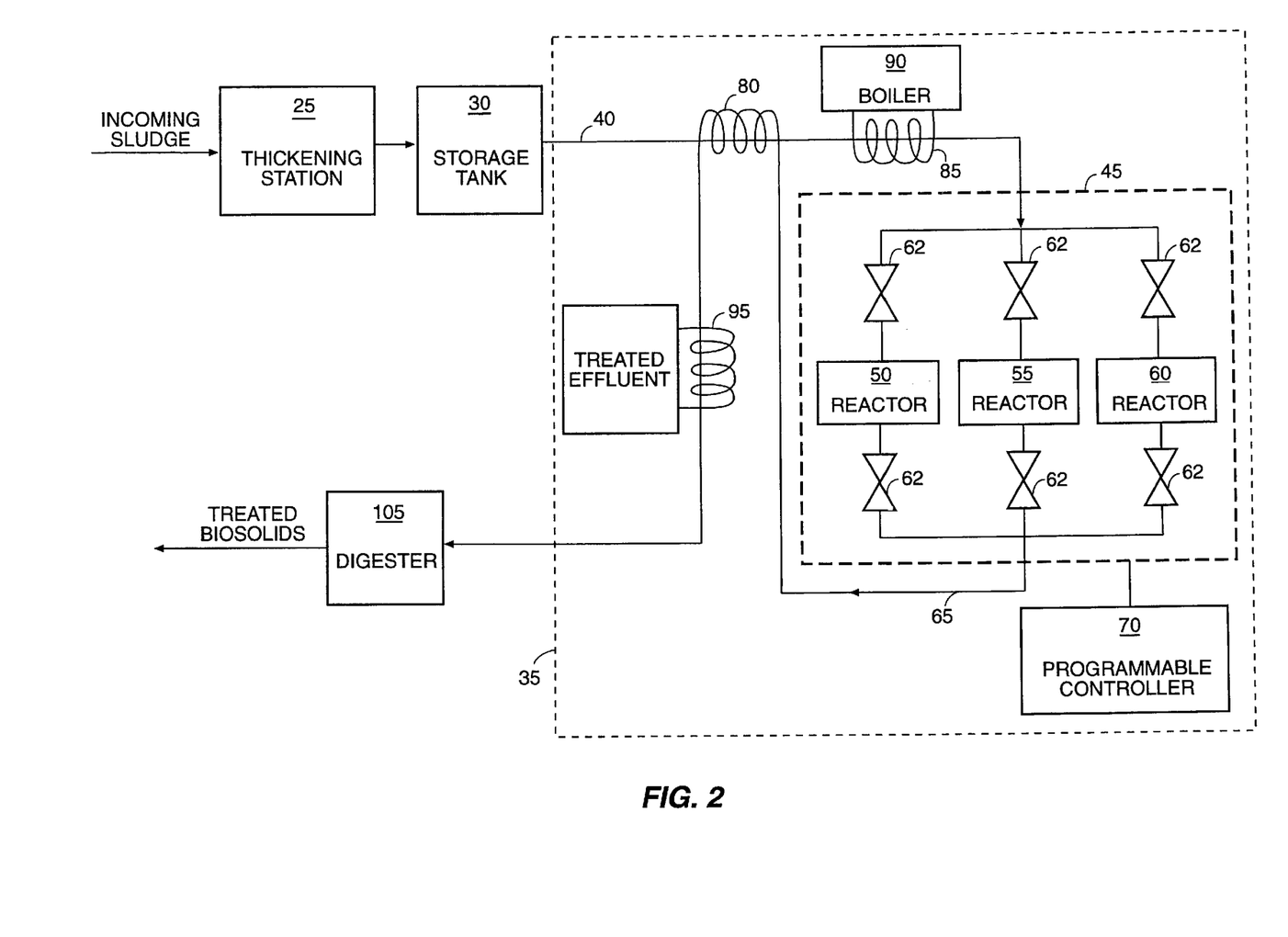
FIG. 2 is a schematic illustration of the pathogen reduction system of the present invention showing a particular process for reducing pathogen levels in sludge prior to the sludge being directed to a digester.

Referring to FIGS. 1 and 2, there is shown therein a portion of a wastewater treatment system that includes a pre-digestion or pasteurization pathogen reduction system that is indicated by the numeral 35. As illustrated in FIG. 2, the pathogen reduction system 35 is disposed upstream of a digester 105 and downstream from a sludge thickening station 25 and a sludge storage tank 20. Disposing the pathogen reduction system 35 upstream with respect to the digester is generally preferred. However, it should be pointed out, that the pathogen reduction system 35 could be employed downstream from the digester 105.

Pathogen reduction system 35 is designed to treat sludge and to remove pathogens, such as bacteria, viruses, etc., from the sludge. Generally, the sludge being treated by the pathogen reduction system 35 constitutes either primary or secondary sludge or both. Those skilled in the art will appreciate that primary sludge is typically separated from influent wastewater during the course of primary treatment. Secondary sludge, on the other hand, is separated from the wastewater during the course of secondary treatment.

In conventional sludge treatment, both the primary and secondary sludge is combined and after being combined, is directed to a digester such as anaerobic or aerobic digester. Once in the digester, the sludge is held for an extended time, sometimes on the order of approximately 30 days, and at a selected temperature level which is typically about 30–35° C. During the process, the digester performs two important functions. First, the digester rids the sludge of pathogens such as bacteria, viruses, etc. Secondly, the digester removes or at least substantially reduces, volatile solids found in the sludge.

In the sludge treatment process of the present invention, pathogen reduction is separated from the treatment for volatile solids. In fact, pathogen reduction occurs outside of the digester. In the preferred process illustrated and discussed herein, the pathogen reduction system 35 removes the pathogens from the sludge prior to the sludge being admitted to the digester 105. But after the pathogens have been removed from the sludge, the sludge is then directed to the digester 105 which treats the sludge over a period of approximately 15 days so as to remove volatile solids from the sludge. Thus, in the end, with the process of the present invention, the time period of achieving pathogen reduction and the treatment for volatile solids is reduced to approximately 15 days as compared to conventional processes where the same treatment is carried out entirely within a digester in approximately 30 days.

In the case of the present invention, and referring back to FIG. 2, the sludge is first directed to a thickening station 25 that comprises, for example, a mechanical drum thickener which removes some water from the sludge and reduces the incoming sludge from approximately 1 to 2% of total suspended solids (TSS) by weight to approximately 5% total suspended solids. Once the sludge has been thickened, it is transferred from the thickening station 25 to a storage or holding tank 30 that is designed to continuously meter the thickened sludge to the pathogen reduction system 35.

Briefly reviewing the components and structure of the pathogen reduction system 35, it is seen that the same includes a series of reactors that as a group are referred to by the numeral 45. The series of reactors includes three reactors 50, 55 and 60 disposed in parallel relationship. Each reactor is insulated and includes a top driven mixer. In order to control the flow of sludge to and from the reactors there is provided a series of motor driven flow control valves 62 that are associated with the respective reactors and which control the flow of sludge to and from the reactors. In particular, it is seen that there is provided a control valve 62 on both the inlet and outlet side of each of the reactors.

To control the valves 62 and the flow of sludge to and from the reactor network 45, a programmable controller 70 would typically be operatively connected to the respective control valves 62 so as to operate them in a pre-selected and timed sequence. Details of the programmable controller 70 are not dealt with herein in detail because such is not per se material to the present invention and because programmable controllers are used extensively in wastewater treatment systems to control the flow of wastewater and sludge through various system components. In addition, those people ordinarily skilled in the art understand and appreciate how programmable controllers are used to direct and control flow of wastewater and sludge through various components of wastewater treatment systems.

To heat and cool the sludge being directed to and from the reactors, there is provided a heat exchanger network. In the embodiment illustrated herein, the heat exchanger network includes three heat exchangers 80, 85 and 90. As will be appreciated from subsequent portions of this disclosure, the heat exchangers function to heat the sludge being directed to the reactor network 45 and to cool the treated sludge being directed from the reactors to the digester 105.

As will be discussed further below, the pathogen reduction system 35 basically entails heating the sludge to a pre-determined temperature (approximately 55–70° C.) and then storing or holding the sludge for a pre-determined amount of time (approximately 1–10 hours) in order to reduce the level of pathogens within the sludge. Once the sludge has been heated and treated by the pathogen reduction system 35, then the treated sludge is directed to the digester 105 for further treatment, at a lower temperature. This further treatment of the sludge is basically aimed at reducing the level of volatile solids found within the sludge.

Now, turning to the process or method of the present invention, sludge from the storage reactor 30 is directed into an inlet line 40 of the sludge reduction system 35. Typically, this incoming sludge has a temperature of approximately 10–20° C. Inlet line 40 is communicatively coupled to two heat exchangers 80 and 85. More particularly, the sludge passing through inlet line 40 is first passed through heat exchanger 80 and after exiting heat exchanger 80, the sludge is directed through a downstream heat exchanger 85. The first heat exchanger 80 functions to preheat the sludge passing in inlet line 40. More particularly, the treated sludge exiting the network of reactors 45 is directed through outlet line 65 into the same heat exchanger 80 and the heat associated with the sludge passing through line 65 is used to heat or pre-heat the incoming sludge.

To further heat the incoming sludge in inlet line 40, the downstream heat exchanger 85 is communicatively coupled to a boiler 90. Boiler 90 is powered by the methane or biogas produced by the digester 105. More particularly, the source of the heat that is ultimately transferred to the sludge is typically water. Water is circulated through the boiler 90 and is heated thereby and then directed through the heat exchanger 85 in counter-flow relationship to the sludge passing through the same heat exchanger. In the process discussed herein, the aim is to heat the sludge passing through exchanger 85 to such an extent that the sludge reaching the reactor network 45 assumes a temperature within the range of 55–70° C. and more particularly a temperature of approximately 65–70° C.

Once the sludge has been heated by the second heat exchanger 85, it is directed to the series of reactors 45. Each of the reactors 50, 55 and 60 in the embodiment illustrated herein is designed to assume three different modes of operation. The first mode of operation is referred to as a filling mode. This simply means that each reactor is designed to assume a state where sludge is simply being directed into the reactor. In this mode, there is no discharge from the reactor. The second mode of operation is referred to as a holding or treating mode. In this mode, the reactor is designed to simply hold the preheated sludge for a selected time period. There is no feed into the reactor and there is no discharge from the reactor. Finally, the third mode is referred to as a discharge mode. In this mode, sludge is discharged from the reactor and during the discharge mode, there is no sludge being directed into the reactor.

As pointed out above, each of the reactors 50, 55 and 60, are designed such that they continuously cycle through each of the three modes and at any one time during the pathogen reduction process no two reactors will assume the same mode. In other words, during one phase of operation, one reactor will be filling while a second reactor is holding and treating and while a third reactor is discharging. This occurs for a selected or certain time period. At the conclusion of that time period the mode of each reactor will be changed.

In one process disclosed herein, it is contemplated that each cycle or period will last for approximately one hour. Thus, in the way of an example, during the first hour of operation, reactor 50 would assume a filling mode, reactor 55 would assume a holding mode and reactor 60 would assume a discharge mode. During the second hour interval, reactor 60 would assume a filling mode, reactor 50 a holding mode, and reactor 55 a discharge mode. In the third interval or phase of the process, reactor 55 would assume a filling mode, reactor 60 would assume a holding mode and reactor 50 would assume a discharge mode. Thus, each reactor sequentially moves from a filling mode to a holding mode and then to a discharge mode.

In the above example, the incoming sludge is heated to approximately 60–70° C. and the heated sludge is held within the reactors for approximately one hour. It should be noted, however, that the retention time and the temperature of the incoming sludge are interdependent. Generally, as the temperature of the incoming sludge is decreased, the retention time in the reactors should be increased to yield a selected level of pathogen reduction. In any event, those skilled in the art will appreciate that both the retention time of the sludge within the reactors and the incoming temperature of the heated sludge can vary.

After the sludge has been held in one of the reactors 50, 55 or 60 for a selected time period and at a selected temperature range, the sludge is discharged into an outlet line 65. Outlet line 65 feeds into the first heat exchanger 80 and the heat associated therewith is transferred to the incoming sludge found in inlet line 40. From the first heat exchanger 80, the outlet line 65 is connected to a third heat exchanger 95 for the purpose of cooling the sludge to a temperature of approximately 30–35° C. Heat exchanger 95 is operatively connected to a cooling source. In the case of this embodiment, treated effluent that is produced by the wastewater treatment system is directed through heat exchanger 95 and acts to cool the treated sludge prior to its entry into the digester 105.

Preferably, in the embodiment discussed herein, the treated sludge passing into the digester 105 is cooled to a temperature of approximately 30–35° C. Once in the digester 105, the treated sludge is maintained therein for approximately 15 days. It has been found that by maintaining the pre-treated sludge in the digester for a period of approximately 15 days at a temperature of approximately 30–35° C. results in the substantial reduction of volatile solids and produces a purified sludge that can be used on agricultural fields, roadsides, etc. This is sometimes referred to as class A sludge.

As discussed above, the individual reactors 50, 55 and 60 generally perform batch treatment but yet because of the series of reactors and their parallel relationship, the output of the reactors as a group is continuous. Thus, the digester 105 is fed in a continuous manner.

Heat Exchanger

As discussed above, the pathogen reduction system 35 utilizes a series of heat exchangers to heat and cool sludge passing through the system. With particular reference to the drawings, FIGS. 3–5, the heat exchanger design utilized in the pathogen reduction system 35 is shown in detail. As illustrated, the heat exchanger is referred to generally by the numeral 115.

Figure 3:
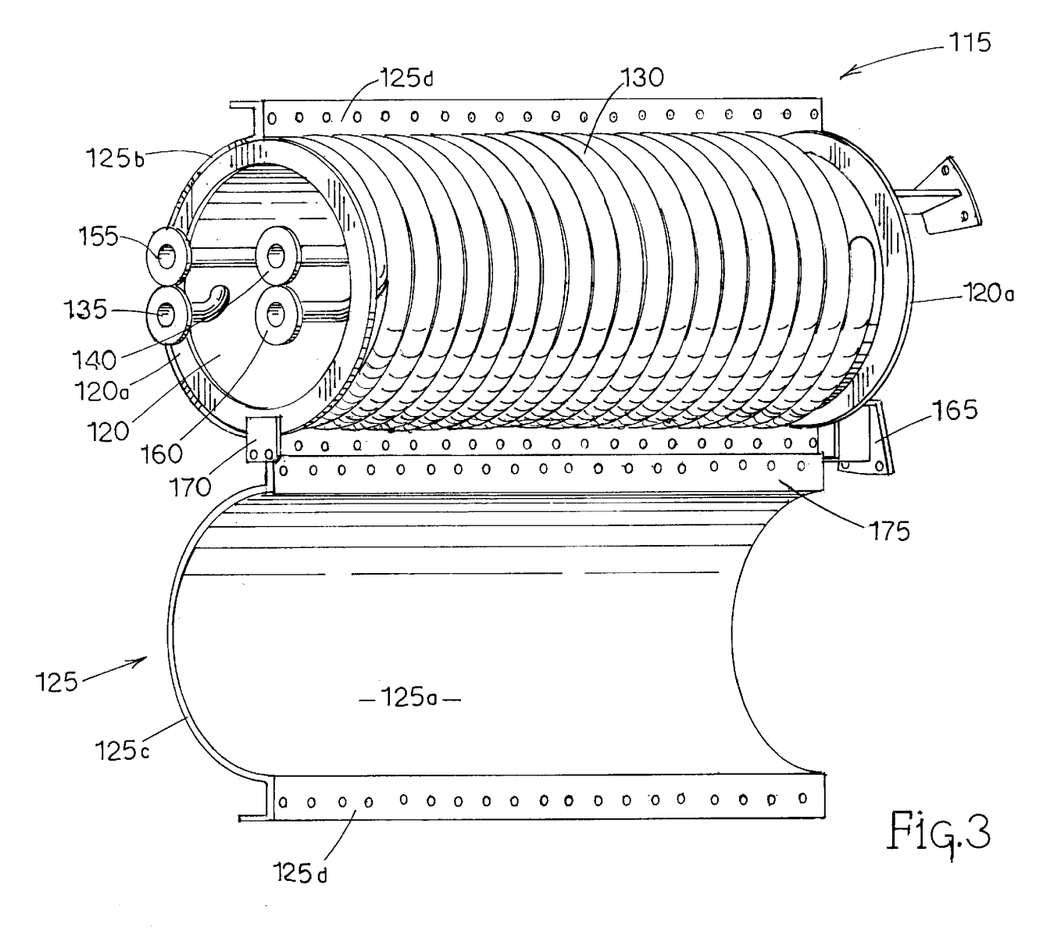
FIG. 3 is a perspective view of the heat exchanger of the present invention showing the heat exchanger in an open configuration.

Structurally, the heat exchanger 115 includes a generally cylindrical inner sleeve 120. Formed about opposite end portions of the inner sleeve 120 is a flange 120*a*. Disposed exteriorly of the inner sleeve 120 is an outer sleeve 125. Outer sleeve 125 includes two half sections 125*a* and 125*b*. Formed about the outer edges of each of the sections 125*a* and 125*b* is a partial annular sealing edge 125*c* (FIG. 3). The function of the annular edges 125*c* is to engage or mate with the outer flanges 120*a* of the inner sleeve 120 so as to form a generally sealed relationship about the opposite end portions of the heat exchanger 115.

Half sections 125*a* and 125*b* of the outer sleeve 125 are supported on an elongated hinge frame 170. A pair of hinge arms 175 are secured about opposite ends of the hinge frame 170 and interconnect the hinge frame 170 with the respective half sections 125*a* and 125*b*. Specifically, the hinge arms 175 permit each of the half sections 125*a* and 125*b* of the outer sleeve 125 to move between a closed position (FIG. 5) and an open position (FIG. 3).

To facilitate the fastening of the half sections 125*a* and 125*b* together, each half section includes an elongated flange 125*d* extending across the edge of the half section opposite the edge that is pivotally connected to the hinge frame 170. Each flange 125*d* is turned outwardly and includes a series of transversely spaced bolt openings. Thus, in the closed position as shown in FIG. 5, the mating flanges 125*d* of each half section 125*a* and 125*b* fit flush such that bolts can be extended through the aligned bolts openings in each so as to permit the edges of the half sections to be tightly secured together.

Figure 4:
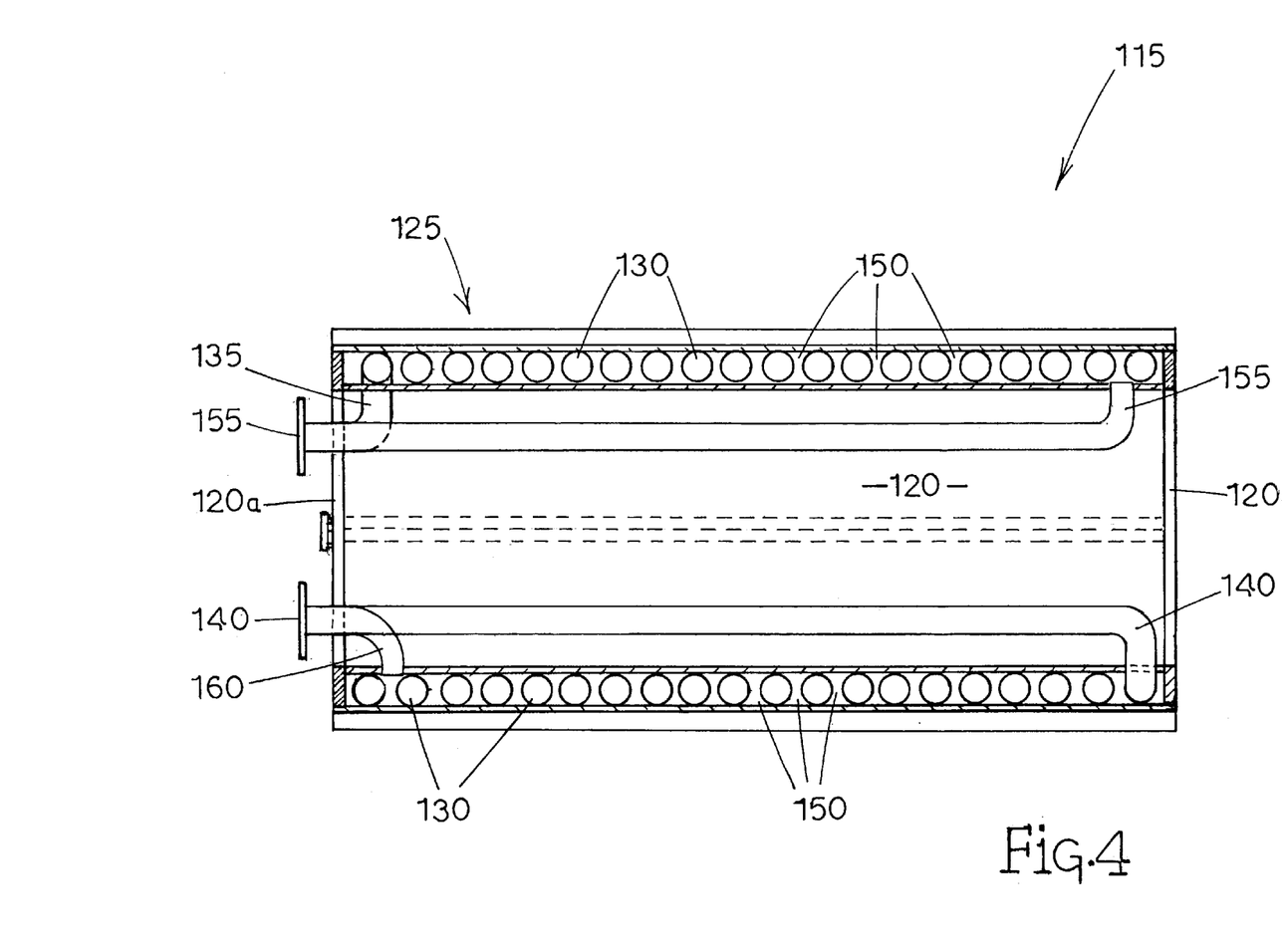
FIG. 4 is a longitudinal sectional view of the heat exchanger shown in FIG. 3.

Secured around the inner sleeve 120 is a helical tubular coil 130. The helical tubular coil includes a series of continuous helical segments that are spaced apart so as to define a helical flow channel 150 therebetween (FIG. 4). Communicatively connected to opposite ends of the helical coil 130 is an inlet 135 and an outlet 140. As illustrated in FIG. 4, both the inlet 135 and the outlet 140 extend inwardly of the inner sleeve 120. Therefore, the inlet 135 and outlet 140 effectively extend through the inner sleeve 120 and communicate with the helical tubular coil 130.

The helical flow channel 150 defined by the continuous helical segments of the tubular coil 130 also include an inlet 155 and an outlet 160. Both inlet 155 and outlet 160 extend inwardly of the inner sleeve 120. The inlet 155 effectively communicates with the flow channel 150 about one end portion of the heat exchanger 115 while the outlet 160 communicates with the flow channel 150 about an opposite end portion of the heat exchanger 115.

Figure 5:
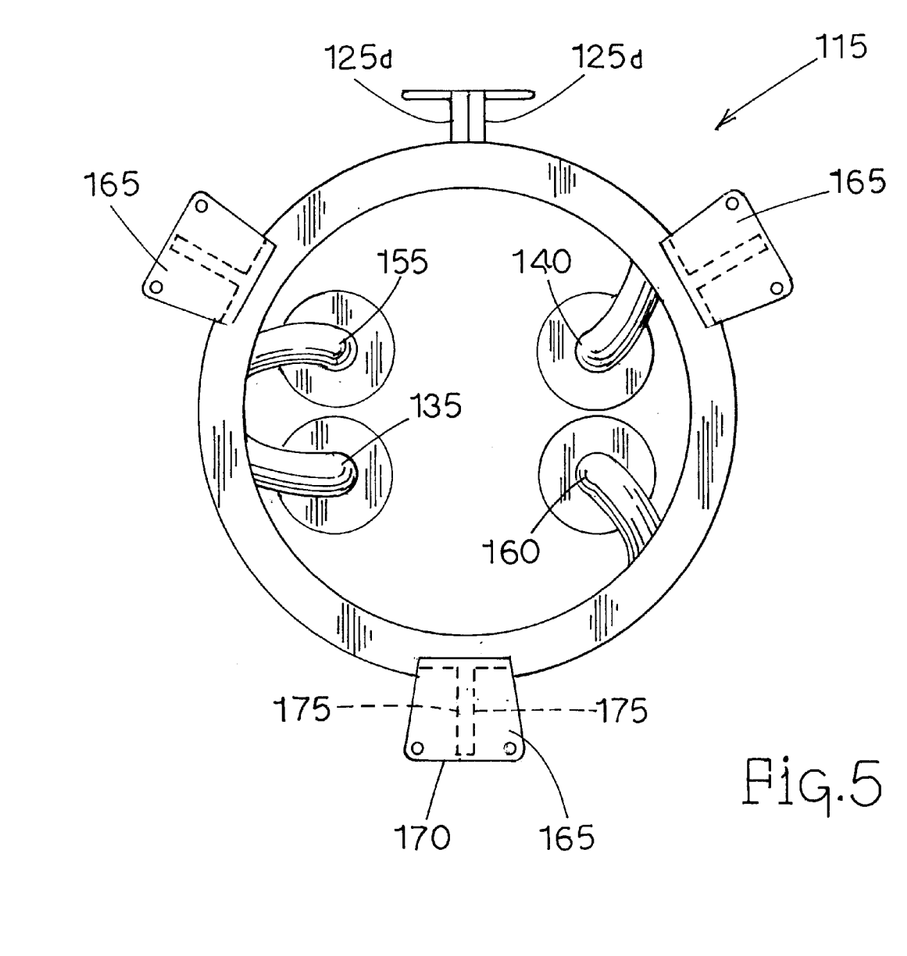
FIG. 5 is an end view of the heat exchanger shown in FIGS. 3 and 4.

When the half sections 125*a* and 125*b* are closed, such as shown in FIG. 5, it is appreciated that the flow channel 150 is defined by the helical tubular coil 130 and the inner and outer sleeves 120 and 125, respectively. In fact, the inner sleeve 130 and the outer sleeve 125 are designed such that in the closed position they form a sealed relationship with the adjacent surfaces of the tubular coil 130. To achieve this sealed relationship, in one embodiment, the tubular coil 130 is expanded, for example, by heating the same, and thereafter the heated coil is placed over the inner sleeve 120. More particularly, the diameter of the helical tubular coil 130 is selected such that it is slightly less than the diameter of the inner sleeve 120. Thus, when the tubular coil 130 is heated it will expand to such a degree that the inner sleeve 120 can be inserted into the tubular coil. Thereafter, the tubular coil 130 cools and closes tightly on the inner sleeve 120. During an ensuing cooling process, the tubular coil 130 contracts so as to form a tight fluid seal between the tubular coil 130 and the inner sleeve 120. Other approaches can be utilized to form a fluid tight seal between the tubular coil 130 and the inner sleeve 120.

To seal the outer sleeve against the outer surface of the tubular coil 130, a sealing material, such as a packing, is interposed between the inner surface of the outer sleeve 125 and the outer surface of the tubular coil 130.

Finally, the heat exchanger 115 is provided with a series of mounting brackets 165 that permit the entire heat exchanger 115 to be suspended or supported while in use.

Therefore, in use, the helical flow channel 150 and the tubular coil 130 are used to hold and direct counter-flowing fluids within the heat exchanger. From the drawings and the prior discussion, it is appreciated that the separation between the continuous helical coil segments actually forms a part of the helical flow channel. That is, in use, one media directed through the heat exchanger 115 is actually directed in the defined flow channel 150 while the other media is directed, preferably in a counter-flow relationship, through the tubular coil 130. Thus, in the case of the heat exchanger 115 being utilized to exchange heat between two sludge streams, as with the case of heat exchanger 80 that forms a part of the pathogen reduction system 35 and illustrated in FIG. 2, it follows that one sludge stream will be moving in a helical fashion through the defined helical flow channel 150 while the other sludge stream will be flowing in a counter direction through the tubular coil 130.

The heat exchanger 115 is particularly desirable for use in conjunction with heavy or viscous fluids that carry suspended solids and which are prone to cause fouling and clogging within the heat exchanger itself. This is because the heat exchanger 115 is very easy to clean and maintain. Periodically, heat exchangers that are used in wastewater and sludge environments do require cleaning. In the case of the heat exchanger 115, the half sections 125a and 125b can be opened (FIG. 3) and the exposed surfaces of the tubular coil 130 and the inner and outer sleeves 120 and 125 respectively, can be thoroughly, quickly and easily cleaned. By maintaining the heat exchanger 115 relatively clean, it follows that the efficiency of the heat exchanger is maintained.

The present invention may, of course, be carried out in other specific ways than those herein set forth without parting from the spirit and essential character of the invention. The present embodiments are, therefore, to be considered in all respects as illustrative and not restrictive, and all changes coming within the meaning and equivalency range of the appended claims are intended to be embraced therein.

What is claimed is:

1. A pre-digestion pathogen reduction system for treating sludge prior to the sludge being directed into a digester in a wastewater treatment system, comprising:
    a) an inlet for directing the incoming sludge into the system;
    b) a series of reactors for receiving the incoming sludge as a series of batches, holding the batches of incoming sludge for a predetermined time to produce a pathogen-reduced sludge, and discharging the batches of treated sludge in a manner so as to form a continuous outflow of treated sludge to the digester, each reactor being operative to assume the feeding, holding, and discharge modes in sequence;
    c) a sludge-to-sludge heat exchanger disposed on an inlet side of the reactors for receiving both the incoming sludge and the treated pathogen reduced sludge and transferring the heat associated with the treated sludge to the incoming sludge;
    d) an outlet for directing the treated sludge from the reactors to the sludge-to-sludge heat exchanger prior to the sludge being directed to the digester such that as the treated sludge passes through the sludge-to-sludge heat exchanger, the heat associated therewith is transferred to the incoming sludge so as to heat the incoming sludge while at the same time cooling the treated sludge; and
    e) at least one additional heat exchanger for cooling the treated sludge leaving the reactors, the additional heat exchanger being a wastewater effluent heat exchanger that is coupled to a source of wastewater effluent wherein the wastewater effluent effectively cools the treated sludge.

2. The system of claim 1 wherein each reactor at any one time is operative to assume a feeding, holding, or discharge mode with respect to the sludge being treated.

3. The system of claim 1 wherein a heating heat exchanger is communicatively connected to an external source of heat and to the incoming sludge such that the external source of heat is utilized to heat the sludge prior to the sludge entering the reactors.

4. The system of claim 1 wherein the reactors are disposed in parallel relationship and operate to treat the sludge in batch form but yet continuously direct sludge from the reactors to the digester.

5. The system of claim 1 wherein there is provided a control valve on both the inlet and outlet sides of each reactor for controlling the flow of sludge into and from the reactor.

6. The system of claim 5 including a programmable controller for controlling the control valves and controlling the flow of sludge to and from the respective reactors.

7. The system of claim 6 including at least three reactors disposed in parallel relationship, and wherein the programmable controller in conjunction with the control valves direct sludge into one reactor while directing sludge from a second reactor while sludge is being held in the third reactor.

8. The system of claim 7 wherein the programmable controller in conjunction with the control valves is operative to sequentially change the mode of operation of each reactor such that during the course of treating the sludge for pathogens each reactor cycles between three separate modes of operation, a filling mode, a holding mode, and a discharge mode.

9. The system of claim 8 wherein the controller is a programmable controller and wherein the programmable controller in conjunction with the control valves controls the mode of each reactor such that in general each reactor cycles through a series of different modes of operation during the pathogen reduction process.

10. A system for reducing the pathogens in sludge comprising: a sludge inlet line; a series of batch reactors connected to the sludge inlet line for receiving incoming sludge therefrom, the series of batch reactors disposed in parallel relationship and wherein during a selected treatment interval one reactor assumes a holding and treating mode and produces treated sludge while the other reactor assumes a discharge mode; a series of heat exchangers for heating incoming sludge and cooling the treated sludge including at least one sludge-to-sludge heat exchanger operatively connected between the sludge inlet line and the series of reactors for heating incoming sludge passing in the inlet line and for cooling treated sludge leaving the reactors and wherein the sludge-to-sludge heat exchanger is connected to the inlet line such that incoming sludge passing through the inlet line is directed through the sludge-to-sludge heat exchanger before reaching the reactors; and wherein the system includes an outlet line for directing treated sludge from the reactors back to and through the sludge-to-sludge heat exchanger such that the treated sludge passing from the outlet line back through the sludge-to-sludge heat exchanger acts to heat the incoming sludge while at the same time the treated sludge is cooled; and a series of control valves disposed on inlet and outlet sides of the reactors and a programmable controller operatively connected to the control valves for controlling the same such that the individual reactors can be controlled to operate in a batch mode while the series of reactors as a group can be controlled to provide a continuous flow of sludge through the reactors.

11. The system of claim 10 wherein the pathogen reduction system is coupled to a digester that reduces the volatile solids within the sludge while the pathogen reduction system reduces the pathogen concentration within the sludge.

12. The system of claim 10 wherein the series of reactors include three reactors disposed in parallel relationship with each reactor sequentially assuming a filling, holding and discharging mode and wherein the operating modes of the three reactors are staggered such that generally the individual reactors assume different operating modes.

13. The system of claim 10 including a series of additional heat exchangers that form a part of the system and which function to further heat and cool the treated sludge and the incoming sludge.

14. The system of claim 13 wherein the series of heat exchangers includes a heat exchanger operatively connected to a wastewater effluent supply and to the treated sludge exiting the reactors for effectively cooling the treated sludge, and wherein the series of heat exchangers includes another heat exchanger connected to an external source of heat and operatively associated with the incoming sludge being directed to the reactors for providing additional heat to the incoming sludge.

15. A method of treating sludge to reduce the pathogen concentration of the sludge comprising:
   a) heating incoming sludge by directing the incoming sludge into and through a sludge-to-sludge heat exchanger;
   b) directing the heated incoming sludge to a series of reactors;
   c) during one phase, holding the heated sludge within one reactor for a selected time period while discharging heated sludge from another reactor;
   d) during another phase, discharging the heated sludge from the one reactor while holding the sludge in the other reactor, thereby processing the heated sludge in batch form while providing a continuous outflow of treated sludge from the reactors;
   e) directing the treated sludge from the reactors back to the sludge-to-sludge heat exchanger and routing the treated sludge back through the sludge-to-sludge heat exchanger such that heat associated with the treated sludge heats the incoming sludge and in the process the heated sludge is cooled;
   f) further cooling the treated sludge by directing the treated sludge to a separate cooling heat exchanger; and
   g) directing treated wastewater effluent to the cooling heat exchanger and utilizing the treated effluent to cool the treated sludge after the treated sludge has exited the reactors.

16. The method of claim 15 including directing the incoming sludge through a second heat exchanger that is operatively coupled to an external source of heat.

17. The method of claim 15 including directing the continuous outflow of treated sludge from the reactors to a digester for further treatment.

18. The method of claim 15 including heating the incoming sludge to a temperature of approximately 60 to 70° C.

19. The method of claim 15 wherein the reactors include three reactors disposed in parallel relationship with each reactor assuming a sludge filling, holding and discharging mode during certain times of the pathogen reduction process, and wherein the operation mode the three reactors are staggered such that generally the three reactors are operating in different modes at any one time such that the sludge is processed in batch form but continuously fed to and from the reactors.

20. The method of claim 19 including holding the sludge within the reactors for approximately one hour.

21. The method of claim 15 including locating the cooling heat exchanger downstream from the sludge-to-sludge heat exchanger such that the treated sludge is cooled by the effluent after it has been first cooled by the sludge-to-sludge heat exchanger.

22. The method of claim 21 including direct the incoming sludge through a second heating heat exchanger prior to the incoming sludge reaching the reactors, and heating a system of water and directing the heated water to the second heating heat exchanger so as to provide additional heat to the incoming sludge prior to reaching the reactors.

23. The method of claim 15 wherein there is provided a control valve on both the inlet and outlet sides of each reactor and wherein the control valves and the flow of sludge through the reactors are controlled by a programmable controller.

* * * * *